United States Patent [19]
Crofut et al.

[11] 3,863,262
[45] Jan. 28, 1975

[54] LASER PHOTOTYPESETTER

[75] Inventors: Walter A. Crofut, Tolland; Robert C. Fletcher, West Hartford; Andrew Tarasevich, West Simsbury; Rodney J. Andersen, South Windsor, all of Conn.

[73] Assignee: Datalight, Inc., Bloomfield, Conn.

[22] Filed: Mar. 21, 1973

[21] Appl. No.: 343,367

[52] U.S. Cl. .................................................. 354/5
[51] Int. Cl. ............................................ B41b 21/08
[58] Field of Search ............... 95/4.5; 250/65; 354/6

[56] References Cited
UNITED STATES PATENTS

| | | | |
|---|---|---|---|
| 2,740,895 | 4/1956 | Miller | 355/84 |
| 2,780,151 | 2/1957 | Borlsof | 95/4.5 |
| 3,146,664 | 9/1964 | Freeman | 95/4.5 |
| 3,532,033 | 10/1970 | Chang | 95/4.5 |
| 3,653,067 | 3/1972 | Anderson | 95/4.5 |

Primary Examiner—John M. Horan
Attorney, Agent, or Firm—Prutzman, Hayes, Kalb & Chilton

[57] ABSTRACT

A laser phototypesetting system in which a pulsed laser beam is formed into a slit of light which sequentially illuminates portions of a character to form a complete character image. An acousto-optical cell performs the dual functions of deflecting the beam to scan the character with the light slit and intensity-modulating the beam.

6 Claims, 1 Drawing Figure

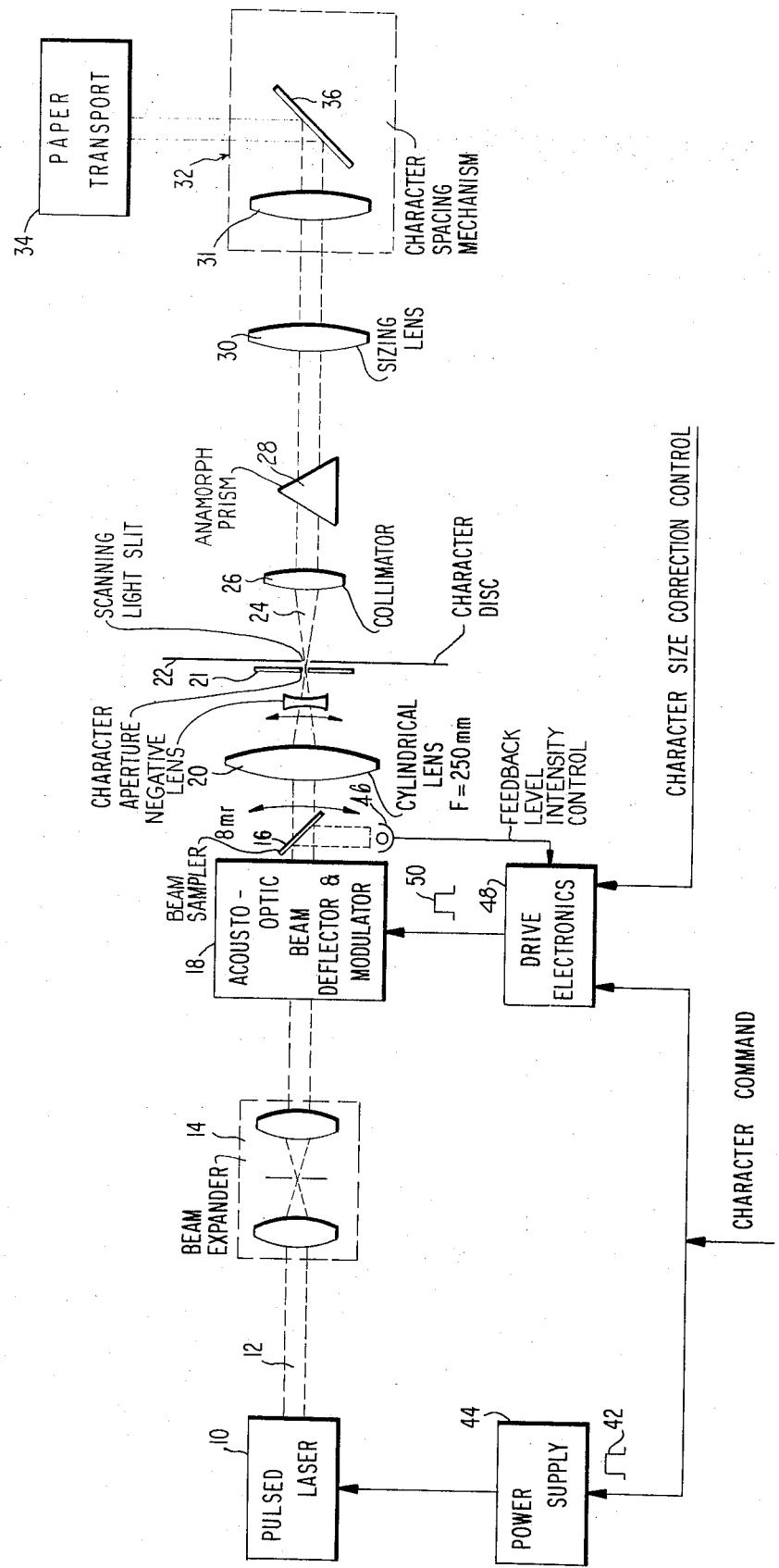

LASER PHOTOTYPESETTER

BACKGROUND OF THE INVENTION

1. Field of the Invention

This invention relates to the field of phototypesetters and more particularly to an improved laser phototypesetter including a single acousto-optical cell for both deflecting and intensity-modulating the laser beam.

2. Description of the Prior Art

Laser phototypesetters per se are known in the prior art. Such phototypesetters use computer-generated character commands for flashing a laser beam and properly deflecting it so that it fully illuminates an entire desired character on a rotating character disc or drum at the time the character is positioned within the character aperture of the optical system. A high power laser is required to generate a sufficiently bright image for recording on certain relatively insensitive media at high speed. Furthermore, intensity-modulation and the deflection of the laser beam have been accomplished by respective individual electro-optical cells connected in tandem in the optical path. There also exists in the prior art the problem of regulating or maintaining constant the intensity of light during each laser pulse or flash and also in regulating the pulse-to-pulse intensity of the light.

SUMMARY OF THE INVENTION

The broad object of the invention is to provide an improved high speed laser phototypesetting system using a much lower power laser for recording on unconventional recording media, such as a heat developable medium.

A more specific object of the invention is to provide an improved laser phototypesetter system employing a scanning slit of light for sequentially illuminating portions of a character; thereby obtaining a very bright character image with a laser of minimum peak power and with minimum blurring of the image.

Another object of the invention is to provide an improved laser phototypesetter system in which a single acousto-optical cell is used for both sweeping and intensity-modulating the laser beam.

Still another object of the invention is to provide an improved laser phototypesetter employing cylindrical optics and an acousto-optical beam deflector for forming a scanning slit of light to sequentially illuminate portions of the characters on a spinning character disc or drum, thereby permitting relatively longer exposure of the complete character while reducing blurring of the character image.

BRIEF DESCRIPTION OF THE DRAWING

The drawing is a schematic diagram of a laser phototypesetter system embodying the invention.

DESCRIPTION OF THE PREFERRED EMBODIMENT

In accordance with the invention, a pulsed argon ion laser 10 emits a laser beam 12 which passes through beam expander optics 14 (and a beam sampler or splitter 16) to an acousto-optical cell 18 which is driven by a frequency-modulated and amplitude-modulated radio frequency drive signal to deflect and intensity-modulate the beam. The output of the cell 18 passes through a cylindrical lens 20 which forms the beam into a horizontally scanning light slit equal in height to the maximum character size. The slit passes through an aperture plate 21 having a character aperture which frames a selected character on a constantly rotating character disc 22. The width of the aperture is about twenty times greater than the width of the light slit so that portions of each selected character are sequentially illuminated by a scanning slit of very bright light.

Beam 24 containing an image of the selected character is collimated by a collimator lens 26 and then passed through an anamorphic prism 28 which corrects for the one dimensional distortion introduced by the scanning slit of light. A sizing lens 30, which is part of a turret assembly, works in conjunction with a travelling lens 31 in a character spacing mechanism 32 to determine the proper character magnification. The character image is then reflected from the character spacing mechanism to a recording medium in a paper transport 34. Additionally, the travelling lens 31 and a mirror 36 move together to space the characters across each line of the recording medium. The optic system, including the collimator, sizing lens, character spacing mechanism, and the paper transport, is conventional and per se is not part of this invention.

The character disc 22 contains a character matrix of different character fonts disposed in concentric rows. As is well known in the prior art, the character disc contains peripheral reference slits which are photo-optically sensed and fed to a computer which keeps track of which character is aligned with the character aperture in the aperture plate 21.

As is also well known in the prior art, an input command issued by an external device such as a computer assures that the laser 10 is pulsed or flashed at the time the desired character is aligned with the character aperture. The computer also generates character size correction control signal to maintain constant the character image size regardless of the radial position of the character on the disc. This is accomplished by changing the scanning rate of the slit of light to correspond with the with the radial position on the disk for the desired font.

When the input command is issued, the following events take place. First, the travelling optics 31 and 36 in the character spacing mechanism 32 moves a specified distance from the previous character as determined by the computer. The character disc 22 then shifts position radially, i.e., its axis of rotation is translated, if required to place the correct font row into alignment with the character aperture in the aperture plate 21. Next, the turret or sizing lens 30, which contains various lenses, rotates to a position where the correct character image size will result when the character is flashed by the laser 10.

After all mechanical stepping has taken place, the phototypesetter system is ready to flash. In order to flash at the correct instant, the character called for by a character command signal has to be properly framed or aligned within the character aperture. The disc 22 is continuously rotating at high speed while the previous mechanical motion has been taking place, and the outer row of the disc carries a series of timing marks which are counted by a photodiode (not shown) until the desired character is aligned with the character aperture. At this time the computer generates the character command signal in the form of a pulse 42 which commands a power supply 44 to pulse or flash the laser 10.

To reduce the amount of peak power that the laser must deliver through the optical system to the recording medium in the paper transport 34, the laser light is focused from a circular beam into a line or slit of light by means of the cylindrical lens 20. This slit or line is then scanned or swept by the cell 18 in one direction either parallel or anti-parallel to the direction of rotation of the character disc to sequentially illuminate portions of a selected character, thereby allowing a relatively long exposure of each complete character with a minimum amount of blur in the character image. For example, a 40 microsecond exposure in this system is equivalent to a 2 microsecond exposure in a conventional system. Scanning parallel to the spinning disk results in an enlarged character. Scanning antiparallel to the disk results in a shrinking of the character. Such scanning or sweeping of the laser beam also helps to eliminate interference effects caused by the reflections from the many surfaces in the optical train. Because the laser beam is so monochromatic, interference beams are almost always present and lead to a non-uniform exposure of the recording media.

In accordance with another aspect of this invention, this scanning or sweeping is accomplished by a beam deflector in the form of the acoustooptical cell 18. In such a cell, ultrasonic sound waves travelling through the medium of the cell causes minute changes in the index of refraction in a periodic manner. These periodic changes in the index of refraction generate a phase grating which diffracts the light in a particular direction with high efficiency. As the frequency of the sound changes, the angle of diffraction also changes, and as the intensity of the sound changes, the intensity of diffracted light changes in a corresponding manner. Thus, in accordance with this aspect of the invention, a single ultrasonic cell is used simultaneously to both scan or sweep the light slit and also to regulate the intensity of the laser pulses.

Such intensity regulation is important as the laser 10 tends to change output intensity with time, thereby changing the exposure of the recording medium. Also, in a pulsed laser, the intensity of each laser pulse tends to vary throughout the pulse period. Thus, beam splitter 16 acts as a beam sampler to deflect a portion of the laser beam to a photocell 46 which generates an electrical feedback level intensity control signal which is applied to the cell drive electronics 48. As a result, the cell drive signal 50 is amplitude modulated to regulate the intensity of the light throughout each laser pulse as well as to regulate the intensity from one pulse to the next.

Let us now return to the scanning or deflection function of cell 18. The character command signal 42 is also applied to the drive electronics to produce the cell drive r.f. signal 50 which is frequency modulated at a rate to produce the angular deflection, such as eight milliradians, to obtain the desired character exposure. This one dimensional scanning introduces a one dimensional distortion in the imaged character. The amount of distortion depends upon the velocity of the scanning slit of light relative to the linear velocity of the character. It is possible to compensate for one specific amount of distortion by use of an anamorphic prism 28.

The modulating frequency is thus controlled in accordance with the radial position of the scanned character in order to maintain constant the size of the character image. More specifically, the scanning rate is increased as the radius of the character on the disc increases, since the linear speed of points on the disc surface increases with increasing radius. The character size correction is accomplished by the character font control signal which specifies the radial position of the disk and which is applied to the drive electronics 48 to suitably vary the rate of the modulating frequency of the cell drive signal 50 in accordance with the radial shift of the axis of ratation of disc 22. A typical desired character exposure time is two microseconds.

Using the approach of this invention, i.e. illuminating the characters with a scanning light slit, results in much lower power requirements for the laser as compared to the prior art approach of fully illuminating the entire character with a laser beam. For the case of the scanning light slit being 1/20 the width of the character aperture, the laser light need be only 1/20 of that required in the prior art approach for producing a character image of the same brightness. The acousto-optical cell 18 may be for example, an optical modulator similar to a Model DLM-1 manufactured by Datalight, Inc.

While the invention has been particularly shown and described with reference to the preferred embodiment thereof, it will be understood by those skilled in the art that various changes in form and details may be made therein without departing from the spirit and scope of the invention.

We claim:

1. In a laser phototypesetting system for imaging selected characters from a moving character carrier onto a recording medium which is stationary during character imaging periods, the improvement comprising;
    a. An acousto-optical cell in the path of the laser beam; and
    b. electronic means for applying a frequency-modulated and amplitude-modulated drive signal to said cell to simultaneously periodically deflect the beam in accordance with the modulation frequency to scan portions of a selected character sequentially and intensity modulate the beam in accordance with the amplitude modulation to regulate the uniformity of the intensity of the beam.

2. the improved laser phototypesetting system as defined in claim 1 further comprising lens means in the path of the laser beam for forming the laser beam into a light slit which sequentially illuminates portions of characters on the carrier to form corresponding character images.

3. The improved laser phototypesetting system as defined in claim 1 further comprising photoelectric means in the path of the laser beam for sampling the intensity of the beam and for producing a corresponding feedback control signal for varying the amplitude modulation of the cell drive signal to regulate the intensity of the beam.

4. The improved laser phototypesetting system as defined in claim 1 wherein the character carrier is a rotating disc carrying characters at different radial distances from the axis of rotation of said disc, and further comprising means for varying the modulating frequency of the cell drive signal in accordance with the radial distance of each selected character, whereby the sizes of all character images are the same.

5. In a laser phototypesetting system for imaging selected characters from a moving character carrier onto a recording medium, the improvement comprising:
    a. means forming a pulsed laser beam;

b. means in the path of the laser beam for forming the beam into a light slit having a width substantially narrower than the width of the character;

c. means for supporting the recording medium relatively stationary during character imaging periods;

d. electronic means having no mechanical inertia for sweeping the light slit across the width of a selected character to illuminate portions of the selected character sequentially to permit longer exposure of the character while producing a very bright character image with minimum blurring and to minimize interference fringes; and e. photoelectric means in the path of the laser beam for sampling the intensity of the beam and for producing a corresponding feedback control signal for varying the amplitude modulation of the cell drive signal to regulate the intensity of the beam.

6. In a laser phototypesetting system for imaging selected characters from a moving character carrier onto a recording medium, the improvement comprising:

a. means forming a pulsed laser beam;

b. means in the path of the laser beam for forming the beam into a light slit having a width substantially narrower than the width of the character;

c. means for supporting the recording medium relatively stationary during character imaging periods;

d. electronic means having no mechanical inertia for sweeping the light slit across the width of a selected character to illuminate portions of the selected character sequentially to permit longer exposure of the character while producing a very bright character image with minimum blurring and to minimize interference fringes; and e. said character carrier being a rotating disc carrying characters at different radial distances from the axis of rotation of said disc, and further comprising means for varying the modulating frequency of the cell drive signal in accordance with the radial distance of each selected character, whereby the sizes of all character images are the same.

* * * * *